(12) United States Patent
Wang et al.

(10) Patent No.: US 8,289,875 B2
(45) Date of Patent: Oct. 16, 2012

(54) PROPORTIONAL FAIRNESS SCHEDULER AND SCHEDULING METHOD USING IMPERFECT CQI FEEDBACK

(75) Inventors: Gang Wang, Beijing (CN); Su Yi, Beijing (CN); Yong Xia, Beijing (CN)

(73) Assignee: NEC (China) Co., Ltd., Beijing (CN)

( * ) Notice: Subject to any disclaimer, the term of this patent is extended or adjusted under 35 U.S.C. 154(b) by 381 days.

(21) Appl. No.: 12/627,909

(22) Filed: Nov. 30, 2009

(65) Prior Publication Data

US 2010/0135236 A1 Jun. 3, 2010

(30) Foreign Application Priority Data

Dec. 1, 2008 (CN) .......................... 2008 1 0178836

(51) Int. Cl.
*G01R 31/08* (2006.01)
*H04W 4/00* (2009.01)
(52) U.S. Cl. ......................... 370/252; 370/329
(58) Field of Classification Search ........................ None
See application file for complete search history.

(56) References Cited

U.S. PATENT DOCUMENTS 7,912,490 B2 * 3/2011 Pietraski ....................... 455/522
2004/0203476 A1 * 10/2004 Liu ................................. 455/69

* cited by examiner

*Primary Examiner* — Nittaya Juntima
(74) *Attorney, Agent, or Firm* — Sughrue Mion, PLLC

(57) ABSTRACT

The present invention proposes a proportional fairness scheduler used in a base station, which is applicable to a high mobility environment, the scheduler comprising: a correction factor estimator which, for each user equipment in a serving cell of the base station, estimates a correction factor for an instantaneous transmission rate for a next frame according to a statistical result on changes in a channel quality in a current frame; a metric calculator which, for each user equipment in the serving cell of the base station, calculates a metric based on the instantaneous transmission rate for the user equipment, the estimated correction factor and a history throughput recorded for the user equipment; and a transmission opportunity granter which grants a transmission opportunity in the next frame to a user equipment having the optimal metric out of all the user equipments. Also, the present invention proposes a proportional fairness is scheduling method used in a base station.

42 Claims, 9 Drawing Sheets

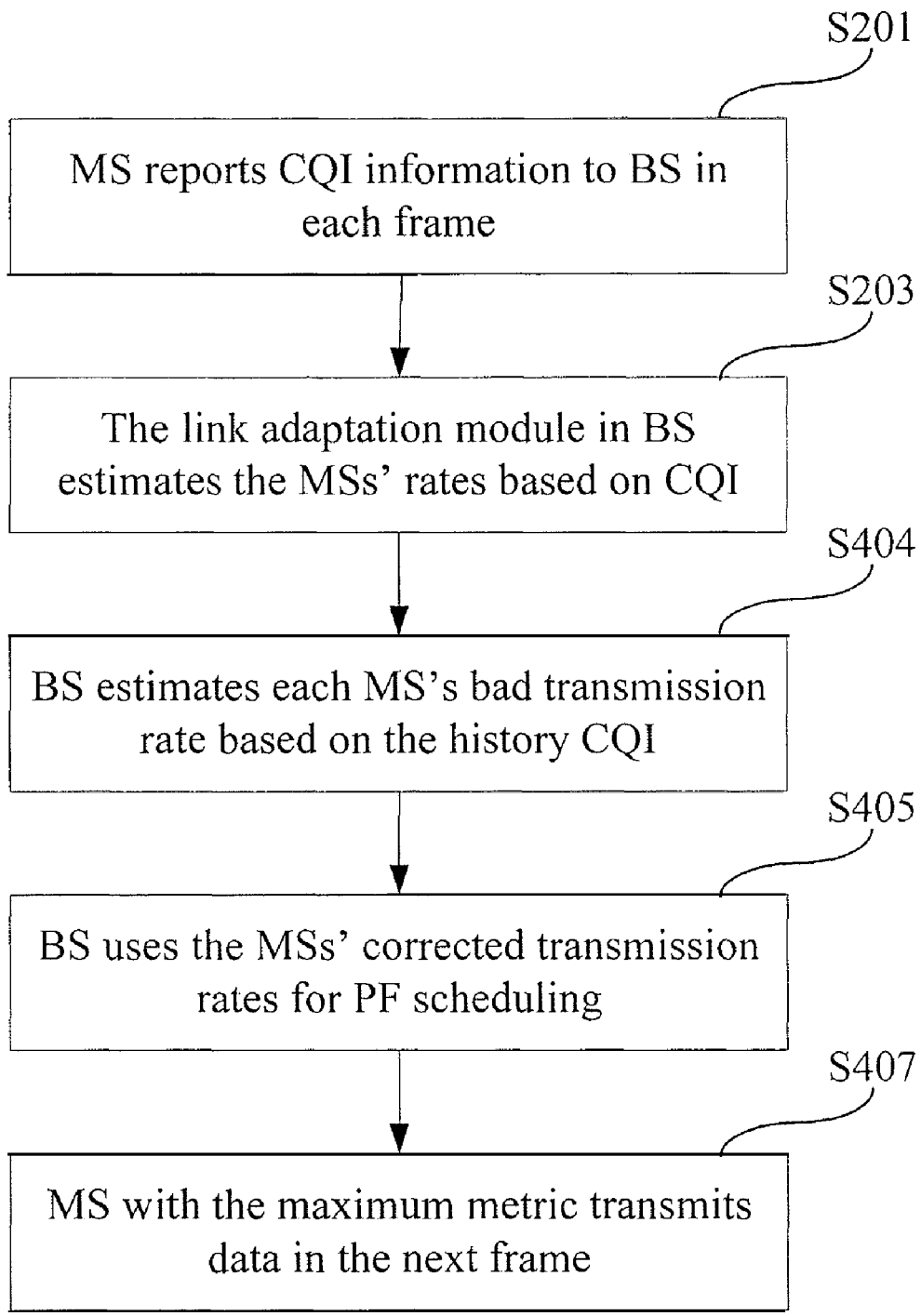

PROPORTIONAL FAIRNESS SCHEDULER AND SCHEDULING METHOD USING IMPERFECT CQI FEEDBACK

BACKGROUND OF THE INVENTION

1. Field of Invention

This invention relates to mobile communications field, and more particularly, to a scheduling method using imperfect CQI (Channel Quality Information) feedback and a scheduler using the scheduling method, especially for WiMAX.

2. Description of Prior Art

IEEE 802.16, also known as WiMAX, has emerged as a strong candidate standard for the future wireless systems, primarily because it offers the potentials for high spectral efficiency, flexible spectrum options, and scalable carrier bandwidth options, as well as the most promising feature, mobility. To achieve above goals, is the WiMAX physical layer (PHY) is based on OFDM (Orthogonal Frequency Division Multiplexing), a scheme that offers good resistance to multi-path and allows WiMAX to operate in NLOS (Non Line Of Sight) conditions. The OFDM technology is also widely recognized as the PHY method for the next generation communications, like 3G LTE (Long Term Evolution). WiMAX's high spectral efficiency is also obtained by using high order modulation and error correction coding scheme under very good signal conditions.

In WiMAX, the whole spectrum is divided into many sub-carriers, and a frame includes many symbols. The combination of carriers and symbols is the radio resource which could be allocated to MS for data transmission. To track the wireless channel, a pilot signal is inserted into sub-carriers every symbol. The channel quality could be estimated by the received pilot signal.

FIG. 1 is a schematic diagram showing a typical WiMAX network scenario.

For example, in a typical mobile WiMAX system shown in FIG. 1, the mobile station (MS) 41, 42, 43 or 44 sends or receives data to or from the base station (BS) 31 or 32 through its wireless interface. The WiMAX BSs 31 and 32 are connected to the internet 10 through a gateway 20.

In a Cell 1, there are lots of MSs (41, 42 and 43). Some are static users (static user 41), some are moving slowly (pedestrian user 42) while communicating with others through their WiMAX handsets, and some are using handsets on vehicles (vehicular users 43). However, due to multi-path fading and mobility, the wireless channel is not stable with the time. It is changing from time to time. Deep fading can cause one user's data transmission failed. This wastes the wireless bandwidth. To solve the problem, the proportional fairness scheduling algorithm is proposed. The BS scheduler always picks the user who has the best channel quality for data transmission. This is also known as the multi-user diversity. For example, in FIG. 1, each MS 41, 42, 43 or 44 reports its channel quality information (CQI) to the BS 31 or 32 periodically. A packet scheduler in the BS 31 or 32 decides data of which MS 41, 42, 43 or 44 to be transmitted in the next frame based on the MSs' CQI.

Basically, there are two problems that the BS packet scheduler should solve: to increase the spectrum efficiency (also known as the cell throughput) and to guarantee the fairness among multiple MSs.

On the one hand, the goal of the BS packet scheduler is to allocate the radio resource (sub-carriers and symbols in a frame) to an appropriate MS among multiple MSs whose channel conditions are various. For example, when an MS's channel is in a good condition, allocation of resource to such station would gain good spectrum efficiency and a high cell throughput. But if the BS allocates resource to an MS whose channel condition is bad, the spectrum efficiency and cell throughput are low. This problem should be solved by the BS packet scheduler.

On the other hand, if all the resource is allocated to the MSs whose channel conditions are good, the throughput would be very low for the MSs whose channel conditions are bad. In this case, the fairness among multiple MSs is deteriorated. The BS packet scheduler should also handle such a problem.

To solve the problems, a proportional fairness (PF) scheduling algorithm is first proposed in Reference [1]. Then it is adopted as the default working scheduling algorithm in IEEE 802.16m (cf. Reference [2]).

FIG. 2 is a flowchart showing the PF scheduling process.

Referring to FIG. 2, first, each MS collects the CQI status during a frame length. The value could be measured through pilot signal or data signal. Then it feedbacks the information to the BS through a dedicated logical channel (specified time and frequency) or data channel (S201). When the BS collects each MS's CQI information in the last frame, it first utilizes a link adaptation algorithm to get each MS's instantaneous transmission rate (S203). Then a PF scheduling algorithm is applied which picks the user for data transmission in the next frame (S205).

The key idea of the PF scheduling algorithm can be described as:

The user with the highest metric $$M = \max_i(M_i)$$

out of all N users will receive transmission opportunity in the next frame (S207).

$$M_i = \frac{R_i^{current}}{R_i^{history}} \quad (1)$$

where $R_i^{current}$ is the user i's instantaneous rate at the scheduling moment. It is decided by the feedback CQI according to a CQI-Rate mapping table in the link adaptation module. $R_i^{history}$ is the user i's history throughput.

According to the PF scheduling algorithm, when two users have the same history throughput, the one with higher instantaneous rate (high CQI) would get the transmission opportunity in the next frame, which increases the system throughput (spectrum efficiency). When the two users have the same instantaneous rate, the one with the lower history average rate (throughput) will transmit its data in the next frame, which guarantees the fairness between users. So, a PF scheduler could solve the problem listed above.

Reference [3] provides a PF scheduling method for high speed downlink packet access (HSDPA) system. At the scheduling time point, the BS queries each user's transmission block size to decide the user's current transmission rate $R_i^{current}$ in Equation (1).

Reference [4] applies a PF scheduling algorithm into a wireless network with relay stations. The PF scheduling part is the same as the existing solution (Reference [1]).

Reference [5] is the same as the traditional PF scheduling algorithm, except that it uses BLER (Block Error Rate) to correct the scheduling metric. It assumes the measured feedback CQI information is reliable, however, in a high mobility scenario, it is not true. So the unreliable CQI could lead to a bad system performance.

The algorithms in the prior arts all assume that the feedback CQI is reliable. This is true for static users (low mobility) in the most cases, but does not hold for mobile users. When the MS is moving, the channel Doppler spread effect results in the quick channel condition variation. When the channel degrades to a bad condition, the transmitted packet is lost. The Doppler effect is proportional to the speed of the mobile station. This means that at higher moving speeds, the channel changes more quickly, and it is more difficult for the receiver to track it. In such a case, the reported CQI of the fast moving MS is not as reliable as the low mobility MS. So the packet scheduling algorithm based on the reported CQI would cause the system throughput deteriorated.

Although the short CQI report interval could alleviate such a problem in some extent, however, for WiMAX system, the 5 ms report duration makes the Doppler effect obvious. On the other hand, a shorter frame length could not solve the problem when the MS is moving fast.

FIGS. 3A and 3B show the channel changing (BER performance and SNR performance) with time for vehicular users moving at a speed of 120 km/h. For WiMAX system, the minimum scheduling interval is a frame duration which includes 50 symbols time. The received SNR is the feedback CQI. FIG. 3B shows the CQI changes within 2 frames. Due to Doppler spread which is proportional to the user's moving speed, the channel is changing quickly. The low CQI value will lead to BER (Bit Error Rate) rising as shown in FIG. 3A. From the plots as shown in FIGS. 3A and 3B, we could see that the high/low CQI in the last frame does not definitely mean high/low in the next frame when the MS is moving. Scheduling algorithms such as the ones in the prior arts which are based on this unreliable CQI would lead to a bad cell throughput performance.

SUMMARY OF THE INVENTION

When the MS is moving, its feedback CQI information is not reliable for the PF scheduler to make an accurate resource allocation scheme. But the history CQI variation could be used to estimate the user's transmission rate. So this invention provides a method to correct the MS's transmission rate based on its history observed CQI. On the other hand, since fast channel variation could lead to packet loss, more radio resource should be allocated to the low channel variation users. So this invention also provides a method to computing a weight index of channel variation based on history CQI. Based on the weight index, a weighted PF scheduler is also provided.

According to a first aspect of the present invention, there is provided a proportional fairness scheduler used in a base station, which is applicable to a high mobility environment, the scheduler comprising:

a correction factor estimator which, for each user equipment in a serving cell of the base station, estimates a correction factor for an instantaneous transmission rate for a next frame according to a statistical result on changes in a channel quality in a current frame;

a metric calculator which, for each user equipment in the serving cell of the base station, calculates a metric based on the instantaneous transmission rate for the user equipment, the estimated correction factor and a history throughput recorded for the user equipment; and a transmission opportunity granter which grants a transmission opportunity in the next frame to a user equipment having the optimal metric out of all the user equipments.

According to one embodiment of the present invention, the correction factor for the instantaneous transmission rate for the next frame is an estimated symbol good rate, and the statistical result on changes in the channel quality in the current frame is a symbol bad rate in the current frame, and the correction factor estimator comprises:

a rate calculating unit which, for each user equipment in the serving cell of the base station, calculates a symbol bad rate in the current frame based on channel quality information for respective symbols in the current frame received from the user equipment and a modulation coding scheme to be used in the next frame; and a rate estimating unit which, for each user equipment in the serving cell of the base station, estimates a symbol good rate in the next frame based on the calculated symbol bad rate in the current frame.

Preferably, the modulation coding scheme to be used in the next frame is determined based on the received channel quality information by following a threshold-based mapping method.

Preferably, a modulation coding scheme to threshold mapping table is used to determine the modulation coding scheme to be used in the next frame based on the received channel quality information.

Preferably, a signal-to-noise ratio for the current frame is firstly calculated based on the received channel quality information, and the calculated signal-to-noise ratio is compared with signal-to-noise ratio thresholds in the modulation coding scheme to threshold mapping table to determine the modulation coding scheme to be used in the next frame.

Preferably, the rate calculating unit counts a symbol having a channel quality information value below a threshold corresponding to the determined modulation coding scheme as a bad symbol, and calculates the symbol bad rate in the current frame as a ratio of the number of the bad symbols in the frame to the total number is of the symbols in the current frame.

Preferably, the rate estimating unit estimates the symbol good rate in the next frame based on both the calculated symbol bad rate in the current frame and an estimated symbol bad rate in a previous frame.

Preferably, the rate estimating unit calculates the symbol good rate $\hat{\alpha}_i(n+1)$ in the next frame as:

$$\hat{\alpha}_i(n+1) = 1 - \hat{\beta}_i(n+1)$$

where $\hat{\beta}_i(n+1)$ denotes an estimated symbol bad rate in the next frame and is obtained by the rate estimating unit by following:

$$\hat{\beta}_i(n+1) = \gamma * \beta_i(n) + (1-\gamma) * \hat{\beta}_i(n-1); n \in Z^+$$

where $\beta_i(n)$ denotes the calculated symbol bad rate in the current frame, $\hat{\beta}_i(n-1)$ denotes the estimated symbol bad rate in a previous frame, $\gamma$ is a smoothing factor, the subscript i denotes the $i^{th}$ user equipment in the serving cell of the base station, n denotes the sequence number of frame, and the initial value $\hat{\beta}_i(0)$ when n=1 is set into 0.

Preferably, the metric calculator comprises:

an effective rate estimating unit for estimating an effective transmission rate for the user equipment in the next frame by correcting the instantaneous transmission rate with the estimated symbol good rate in the next frame; and a metric calculating unit for calculating the metric based on the estimated effective transmission rate for the user equipment in the next frame and a history throughput recorded for the user equipment.

Preferably, the effective rate estimating unit estimates the effective transmission rate $R_i^{effective}$ by following:

$$R_i^{effective} = R_i * \hat{\alpha}_i(n+1); n \in Z^+$$

where the subscript i denotes the $i^{th}$ user equipment in the serving cell of the base station, n denotes the sequence number of frame, $R_i$ denotes the instantaneous transmission rate, and $\hat{\alpha}_i(n+1)$ denotes the estimated symbol good rate.

According to another embodiment of the present invention, the correction factor for the instantaneous transmission rate for the next frame is a weight index, and the statistical result on changes in the channel quality in the current frame is a channel quality information standard variance in the current frame, and the correction factor estimator comprises:
a weight index allocator which, for each user equipment in the serving cell of the base station, allocates a weight index to the user equipment based on a channel quality information standard variance in the current frame.

Preferably, the channel quality information standard variance in the current frame is obtained by statistically analyzing channel quality information for respective symbols in the current frame received from the user equipment.

Preferably, the weight index $W_i$ to be allocated to the user equipment is determined by the weight index allocator by:

$$W_i = \begin{cases} 1 & \sum_{i \in all\ MS} \Delta CQI_i(n) = 0 \\ 1 - \dfrac{\Delta CQI_i(n)}{\sum_{i \in all\ MS} \Delta CQI_i(n)} & \text{otherwise;} \end{cases} \quad n \in Z^+$$

where $\Delta CQI_i(n)$ denotes the channel quality information standard variance in the current frame, the subscript i denotes the $i^{th}$ user equipment in the serving cell of the base station, and n denotes the sequence number of frame.

Preferably, the metric calculator comprises:
an effective rate estimating unit for estimating an effective transmission rate for the user equipment in the next frame by correcting the instantaneous transmission rate with the allocated weight index for the user equipment; and
a metric calculating unit for calculating the metric based on the estimated effective transmission rate for the user equipment in the next frame and a history throughput recorded for the user equipment.

Preferably, the effective rate estimating unit estimates the effective transmission rate $R_i^{effective}$ by following:

$$R_i^{effective} = R_i * W_i$$

where the subscript i denotes the $i^{th}$ user equipment in the serving cell of the base station, $R_i$ denotes the instantaneous transmission rate, and $W_i$ denotes the weight index to be allocated to the user equipment.

Preferably, the metric calculating unit calculates the metric $M_i$ by following:

$$M_i = \frac{R_i^{effective}}{R_i^{history}}$$

where the subscript i denotes the $i^{th}$ user equipment in the serving cell of the base station, $R_i^{effective}$ denotes the estimated effective transmission rate, and $R_i^{history}$ denotes the history throughput.

Preferably, the transmission opportunity granter grants the transmission opportunity in the next frame to a user equipment having the maximum metric $$M = \max_i (M_i)$$

out of all the user equipments.

Preferably, the instantaneous transmission rate $R_i$ for the user equipment is determined based on a modulation coding scheme to be used in the next frame by following:

$$R_i = \frac{\text{Bits(each modulation)} * \text{code rate}}{\text{symbol duration}}.$$

According to a second aspect of the present invention, there is provided a base station comprising a receiver which, for each user equipment in the serving cell of the base station, receives channel quality information for respective symbols in the current frame from the user equipment; an adaptive modulation coding unit which, for each user equipment in the serving cell of the base station, determines a modulation coding scheme to be used in the next frame based on the received channel quality information, and thereby determines the instantaneous transmission rate for the user equipment based on the determined modulation coding scheme; and the proportional fairness scheduler according to the first aspect of the present invention.

According to a third aspect of the present invention, there is provided a proportional fairness scheduling method used in a base station, which is applicable to a high mobility environment, the method comprising:
for each user equipment in a serving cell of the base station
estimating a correction factor for an instantaneous transmission rate for a next frame according to a statistical result on changes in a channel quality in a current frame; and
calculating a metric based on the instantaneous transmission rate for the user equipment, the estimated correction factor and a history throughput to recorded for the user equipment;
granting a transmission opportunity in the next frame to a user equipment having the optimal metric out of all the user equipments.

According to one embodiment of the present invention, the correction factor for the is instantaneous transmission rate for the next frame is an estimated symbol good rate, and the statistical result on changes in the channel quality in the current frame is a symbol bad rate in the current frame, and the step of estimating a correction factor for an instantaneous transmission rate for a next frame according to a statistical result on changes in a channel quality in a current frame comprises sub-steps of:
for each user equipment in a serving cell of the base station
calculating a symbol bad rate in the current frame based on channel quality information for respective symbols in the current frame received from the user equipment and a modulation coding scheme to be used in the next frame; and estimating a symbol good rate in the next frame based on the calculated symbol bad rate in the current frame.

Preferably, the modulation coding scheme to be used in the next frame is determined based on the received channel quality information by following a threshold-based mapping method.

Preferably, a modulation coding scheme to threshold mapping table is used to determine the modulation coding scheme to be used in the next frame based on the received channel quality information.

Preferably, a signal-to-noise ratio for the current frame is firstly calculated based on the received channel quality information, and the calculated signal-to-noise ratio is compared with signal-to-noise ratio thresholds in the modulation coding scheme to threshold mapping table to determine the modulation coding scheme to be used in the next frame.

Preferably, a symbol having a channel quality information value below a threshold corresponding to the determined modulation coding scheme is counted as a bad symbol, and the symbol bad rate in the current frame is calculated as a ratio of the number of the bad symbols in the frame to the total number of the symbols in the current frame.

Preferably, the symbol good rate in the next frame is estimated based on both the calculated symbol bad rate in the current frame and an estimated symbol bad rate in a previous frame. Preferably, the symbol good rate $\hat{\alpha}_i(n+1)$ in the next frame is calculated as:

$$\hat{\alpha}_i(n+1)=1-\hat{\beta}_i(n+1)$$

where $\hat{\beta}_i(n+1)$ denotes an estimated symbol bad rate in the next frame and is obtained by following:

$$\hat{\beta}_i(n+1)=\gamma*\beta_i(n)+(1-\gamma)*\hat{\beta}_i(n-1); n\in Z^+$$

where $\beta_i(n)$ denotes the calculated symbol bad rate in the current frame, $\hat{\beta}_i(n-1)$ denotes the estimated symbol bad rate in a previous frame, γ is a smoothing factor, the subscript i denotes the $i^{th}$ user equipment in the serving cell of the base station, n denotes the sequence number of frame, and the initial value $\hat{\beta}_i(0)$ when n=1 is set into 0.

Preferably, the step calculating a metric based on the instantaneous transmission rate for the user equipment, the estimated correction factor and a history throughput recorded for the user equipment comprises sub-step of:
  estimating an effective transmission rate for the user equipment in the next frame by correcting the instantaneous transmission rate with the estimated symbol good rate in the next frame; and
  calculating the metric based on the estimated effective transmission rate for the user equipment in the next frame and a history throughput recorded for the user equipment.

Preferably, the estimated effective transmission rate $R_i^{effective}$ is obtained by following:

$$R_i^{effective}=R_i*\hat{\alpha}_i(n+1); n\in Z^+$$

where the subscript i denotes the $i^{th}$ user equipment in the serving cell of the base station, n denotes the sequence number of frame, $R_i$ denotes the instantaneous transmission rate, and $\hat{\alpha}_i(n+1)$ denotes the estimated symbol good rate.

According to another embodiment of the present invention, the correction factor for the instantaneous transmission rate for the next frame is a weight index, and the statistical result on changes in the channel quality in the current frame is a channel quality information standard variance in the current frame, and the step of estimating a correction factor for an instantaneous transmission rate for a next frame according to a statistical result on changes in a channel quality in a current frame comprises sub-steps of:
for each user equipment in a serving cell of the base station
  allocating a weight index to the user equipment based on a channel quality information standard variance in the current frame.

Preferably, the channel quality information standard variance in the current frame is obtained by statistically analyzing channel quality information for respective symbols in the current frame received from the user equipment.

Preferably, the weight index $W_i$ to be allocated to the user equipment is determined by:

$$W_i = \begin{cases} 1 & \sum_{i\in all\ MS}\Delta CQI_i(n) = 0 \\ 1 - \frac{\Delta CQI_i(n)}{\sum_{i\in all\ MS}\Delta CQI_i(n)} & \text{otherwise}; \end{cases} n \in Z^+$$

where $\Delta CQI_i(n)$ denotes the channel quality information standard variance in the current frame, the subscript i denotes the $i^{th}$ user equipment in the serving cell of the base station, and n denotes the sequence number of frame.

Preferably, the step calculating a metric based on the instantaneous transmission rate for the user equipment, the estimated correction factor and a history throughput recorded for the user equipment comprises sub-step of:
  estimating an effective transmission rate for the user equipment in the next frame by correcting the instantaneous transmission rate with the allocated weight index for the user equipment; and
  calculating the metric based on the estimated effective transmission rate for the user equipment in the next frame and a history throughput recorded for the user equipment.

Preferably, the estimated effective transmission rate $R_i^{effective}$ is obtained by following:

$$R_i^{effective}=R_i*W_i$$

where the subscript i denotes the $i^{th}$ user equipment in the serving cell of the base station, $R_i$ denotes the instantaneous transmission rate, and $W_i$ denotes the weight index to be allocated to the user equipment.

Preferably, the metric $M_i$ is calculated by following:

$$M_i = \frac{R_i^{effective}}{R_i^{history}}$$

where the subscript i denotes the $i^{th}$ user equipment in the serving cell of the base station, $R_i^{effective}$ denotes the estimated effective transmission rate, and $R_i^{history}$ denotes the history throughput.

Preferably, the transmission opportunity in the next frame is granted to a user equipment having the maximum metric $$M = \max_i(M_i)$$

out of all the user equipments.

Preferably, the instantaneous transmission rate $R_i$ for the user equipment is determined based on a modulation coding scheme to be used in the next frame by following:

$$R_i = \frac{\text{Bits(each modulation)} * \text{code rate}}{\text{symbol duration}}.$$

According to a fourth aspect of the present invention, there is provided a proportional fairness scheduling method used in a base station, which is applicable to a high mobility environment, the method comprising:
for each user equipment in a serving cell of the base station
  receiving channel quality information for respective symbols in the current frame from the user equipment;
  determining a modulation coding scheme to be used in the next frame based on the received channel quality information;
  determining the instantaneous transmission rate for the user equipment based on the determined modulation coding scheme;
  estimating a correction factor for the instantaneous transmission rate for a next frame according to a statistical result on changes in a channel quality in a current frame; and
  calculating a metric based on the instantaneous transmission rate for the user equipment, the estimated correction factor and a history throughput recorded for the user equipment;
granting a transmission opportunity in the next frame to a user equipment having the optimal metric out of all the user equipments.

Compared with the prior arts, the invention could combat the throughput loss due to the Doppler effect caused by the user's mobility. On the one hand, the invention provides more accurate rate estimation for PF scheduler. It not only allocates resource based on the user's current CQI, but also based on its history CQI variations. This could avoid the situation where the user's CQI is high now, but becomes low in the next frame. The accurate PF decision could increase the system throughput.

On the other hand, the present invention may also compare the history channel variation of each user's CQI. The BS prefers to allocate resources to those mobile stations whose CQI variation is low. This method gives more priority to the low CQI variation users, which could also increase the system throughput.

BRIEF DESCRIPTION OF THE DRAWINGS

The above and other objects, features and advantages of the present invention will be clearer from the following detailed description about the non-limited embodiments of the present invention taken in conjunction with the accompanied drawings, in which:

FIG. 4 is a flowchart showing a PF scheduling process according to the $1^{st}$ embodiment of the present invention.

DETAILED DESCRIPTION OF PREFERRED EMBODIMENTS

Hereunder, the present invention will be described in accordance with the drawings. In the following description, some particular embodiments are used for the purpose of description only, which shall not be understood as any limitation to the present invention but the examples thereof. While it may blur the understanding of the present invention, the conventional structure or construction will be omitted.

The $1^{st}$ Embodiment

Figure 1:
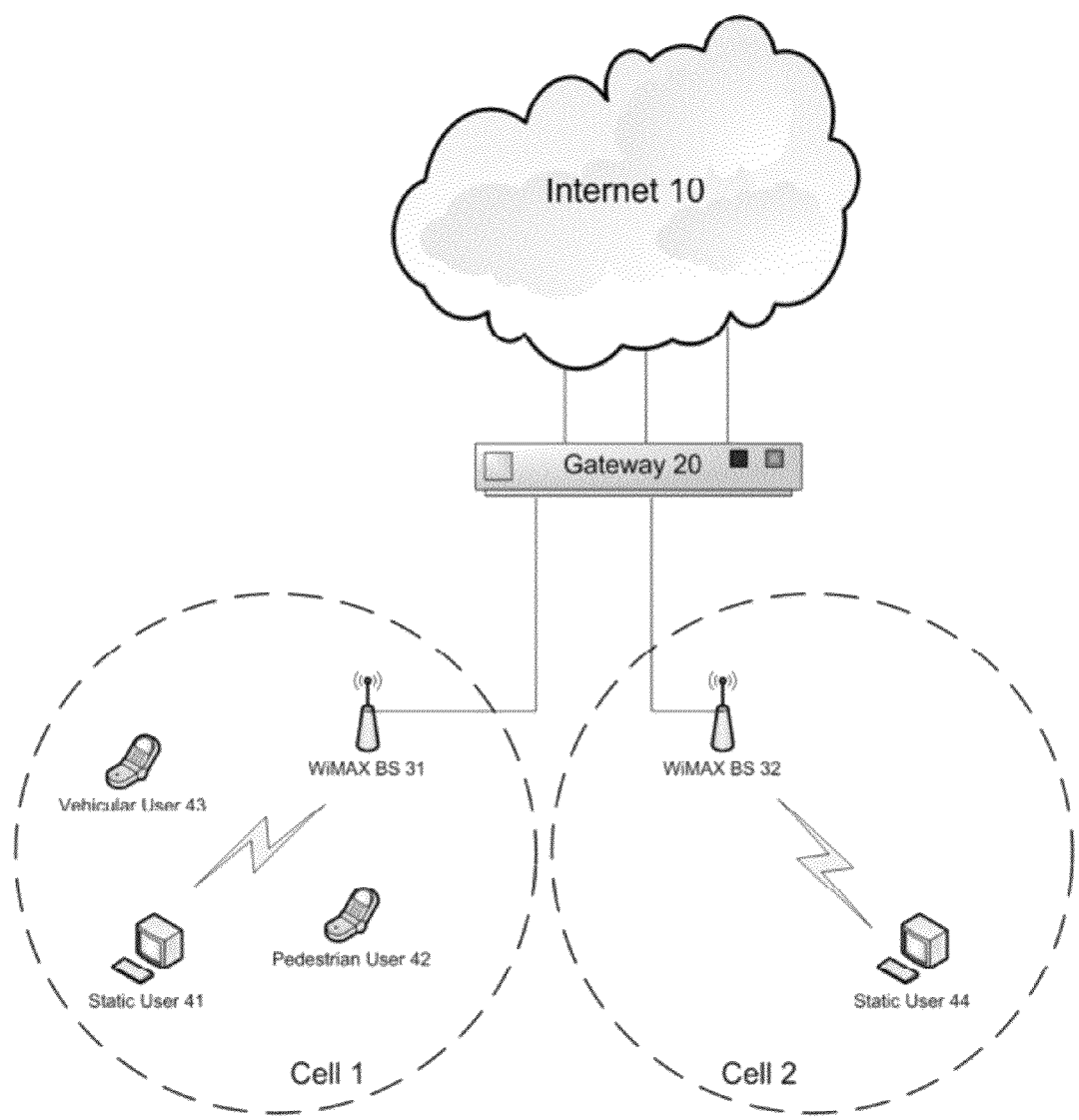
FIG. 1 is a schematic diagram showing a typical WiMAX network scenario.
Figure 2:
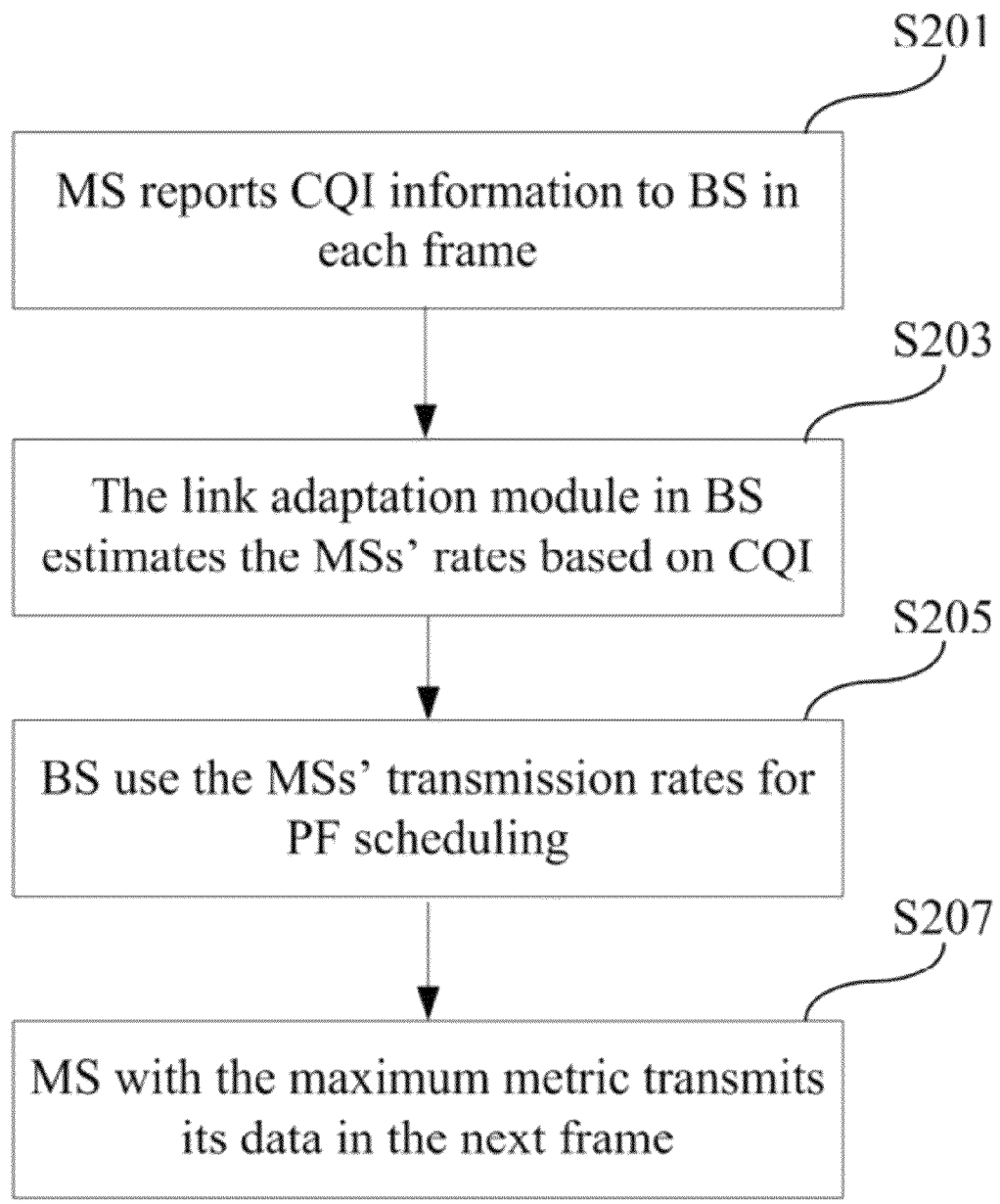
FIG. 2 is a flowchart showing the PF scheduling process.
Figure 3A:
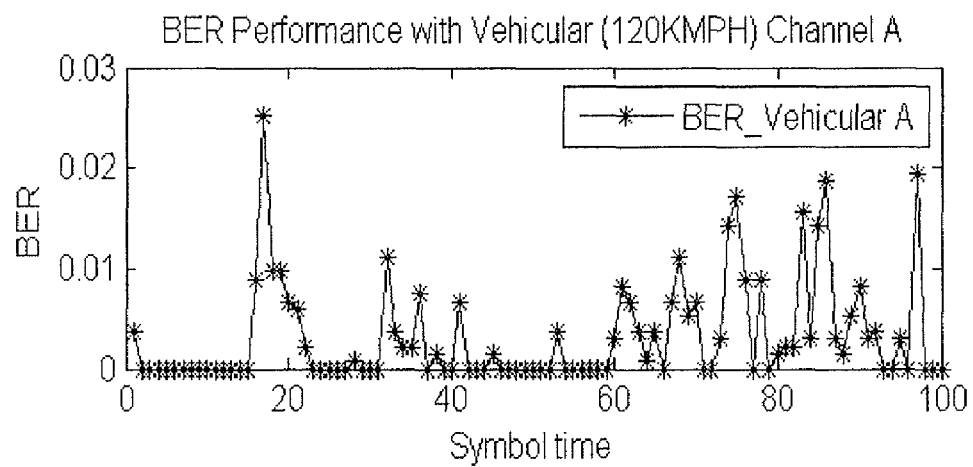
FIGS. 3A and 3B show the channel changing (BER performance and SNR performance) with time for vehicular users moving at a speed of 120 km/h.
Figure 3B:
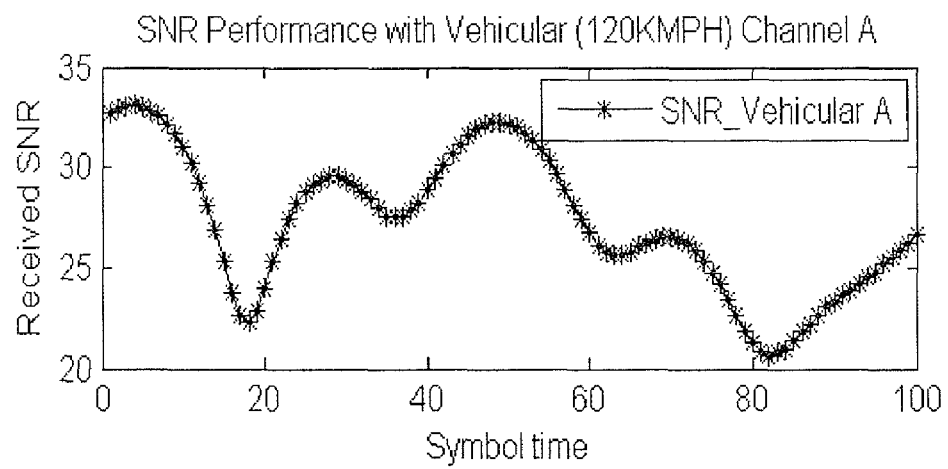

FIG. 4 is a flowchart showing a PF scheduling process according to the $1^{st}$ embodiment of the present invention. It should be noted that those steps same or similar to those ones in FIG. 2 are designated with the same reference number to show their identicalness or similarity.

Referring to FIG. 4, the scheduling process may be described as follows:

In S201, each MS is required to report its CQI information to the BS in each frame. The CQI can be measured by the pilot signal or data message, and could be transmitted to the BS through a signaling channel or dedicated data channel.

In S203, after receiving each user's 001 information, the link adaptation module could map the CQI information to its current transmission rate. Although various mapping methods are available, here we use a threshold based one. For example a typical mapping table is shown in Table 1.

TABLE 1

CQI and MCS mapping

| Modulation | FEC-CC Rate | SNR threshold (dB) |
|---|---|---|
| BPSK | ½ | 13.9 |
| QPSK | ½ | 16.9 |
| QPSK | ¾ | 18.65 |
| 16QAM | ½ | 23.7 |
| 16QAM | ¾ | 25.45 |
| 64QAM | ½ | 29.7 |
| 64QAM | ¾ | 31.45 |

Based on the measured CQI and the threshold, the appropriate modulation coding scheme (MCS) for the next frame is gotten from Table 1. So the instantaneous transmission rate $R_i$ for the $i^{th}$ MS is $$R_i = \frac{\text{Bits(each modulation)} * \text{code rate}}{\text{symbol duration}}. \quad (2)$$

In S404, after the transmission rate is decided in S203, the MCS which the MS will use in the next frame is also decided. BS counts the number of symbols in the last frame whose CQI is below the MCS threshold. On these symbols, the MS's transmission will failed. The $i^{th}$ MS's bad rate $\beta_i$ is defined as:

$$\beta_i = \frac{\text{Num of bad symbols in a frame}}{\text{Num of symbols in a frame}} \qquad (3)$$

Since $\beta_i$ may change from one frame to another, here we use a one-order filter to smooth it. We define $\hat{\beta}_i(n+1)$ is the estimated bad rate in the $(n+1)^{th}$ frame. $\gamma$ is a smoothing factor, $$\hat{\beta}_i(n+1) = \gamma * \beta_i(n) + (1-\gamma) * \hat{\beta}_i(n-1); \ n \in Z^+ \qquad (4)$$

where $\beta_i(n)$ is the $i^{th}$ MS's bad rate in the $n^{th}$ frame, $\hat{\beta}_i(n-1)$ is the $i^{th}$ MS's estimated bad rate in the $(n-1)^{th}$ frame. That is to say, the estimated bad rate $\hat{\beta}_i(n+1)$ in the $(n+1)^{th}$ frame (the next frame) is dependent on the $i^{th}$ MS's bad rate $\beta_i(n)$ in the $n^{th}$ frame (the last frame) and the $i^{th}$ MS's estimated bad rate $\hat{\beta}_i(n-1)$ in the $(n-1)^{th}$ frame (frame immediately before the last frame). The initial value $\hat{\beta}_i(0)$ (when n=1) is set into 0.

So the estimated effective transmission rate $R_i^{effective}$ for the $i^{th}$ MS in the $(n+1)^{th}$ frame is computed as:

$$R_i^{effective} = R_i * (1 - \hat{\beta}_i(n+1)) \qquad (5)$$

in Equation (5), an estimated symbol good rate $\hat{\alpha}_i(n+1)$ in the $(n+1)^{th}$ frame can be defined as: $\hat{\alpha}_i(n+1) = 1 - \hat{\beta}_i(n+1)$, so that Equation (5) may be modified into:

$$R_i^{effective} = R_i * \hat{\alpha}_i(n+1) \qquad (5')$$

As shown in Equation (5'), the estimated symbol good rate $\hat{\alpha}_i(n+1)$ in the $(n+1)^{th}$ frame can be regarded as a correction factor for the instantaneous transmission rate $R_i$ for the $(n+1)^{th}$ frame with respect to the $i^{th}$ MS (Equation (2)).

In S405, the BS uses each MS's corrected transmission rate for PF scheduling. The style of PF scheduling is the same as the prior arts. BS records each MS's history throughput $R_i^{history}$, and picks the MS which has the maximum metric $$M = \max_i (M_i)$$

in Equation (6) for data transmission in the next frame (the $(n+1)^{th}$ number frame).

$$M_i = \frac{R_i^{effective}}{R_i^{history}} = \frac{R_i}{R_i^{history}} * \hat{\alpha}_i(n+1) \qquad (6)$$

In S407, the user with the highest metric $$M = \max_i (M_i)$$

out of all the users which is granted the transmission opportunity in the next frame will transmit its data in the $(n+1)^{th}$ frame.

The 2$^{nd}$ Embodiment

Figure 5:
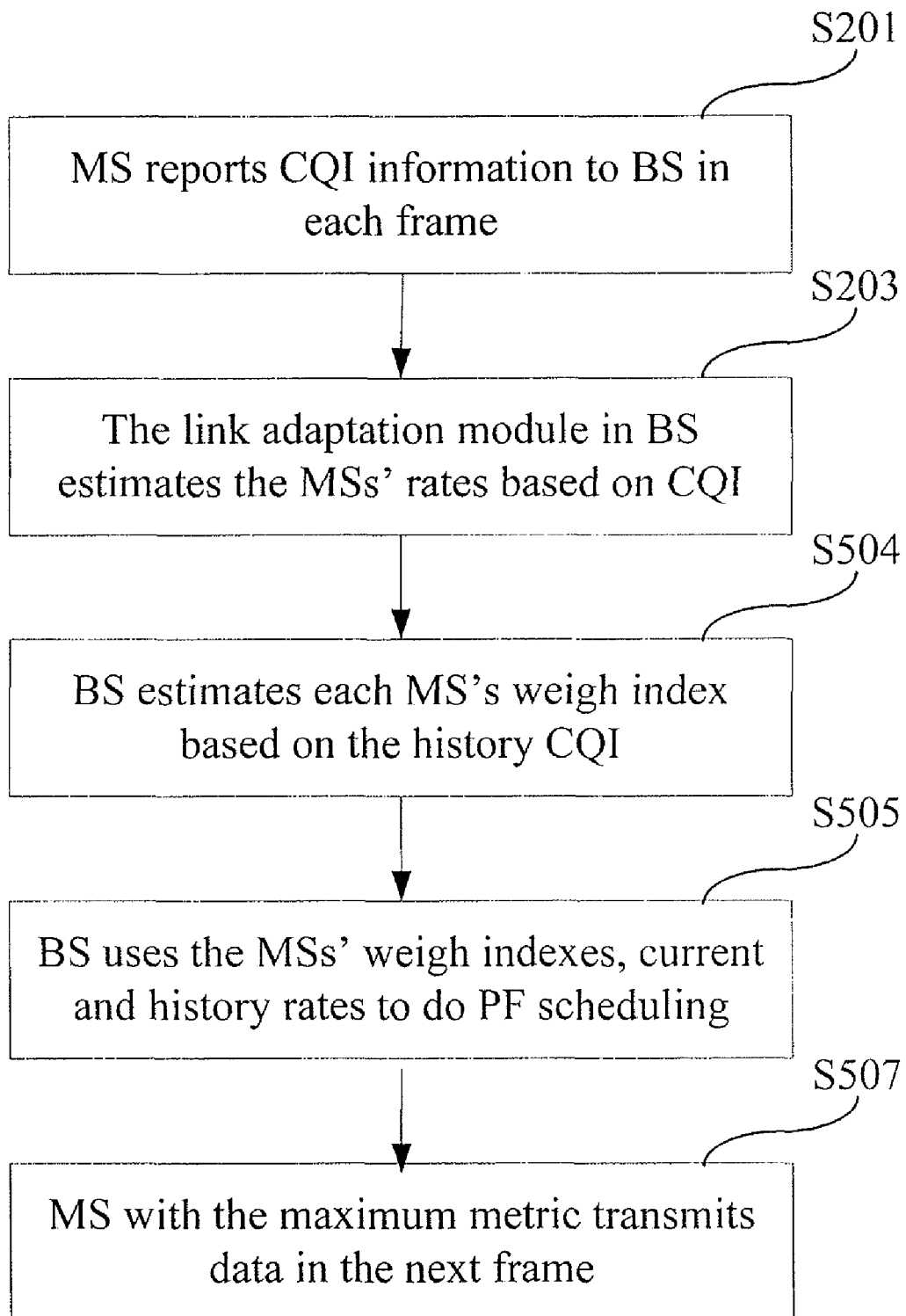
FIG. 5 is a flowchart showing a PF scheduling process according to the $2^{nd}$ embodiment of the present invention.

FIG. 5 is a flowchart showing a PF scheduling process according to the 2$^{nd}$ embodiment of the present invention. It should be noted that those steps same or similar to those ones in FIG. 2 are designated with the same reference number to show their identicalness or similarity.

Referring to FIG. 5, the scheduling process may be described as follows:

In S201, each MS is required to report its CQI information to the BS in each frame. The CQI can be measured by the pilot signal or data message, and could be transmitted to the BS through a signaling channel or dedicated data channel.

In S203, after receiving each user's CQI information, the link adaptation module could map the CQI information to its current transmission rate. Although various mapping methods are available, here we use a threshold based one. The mapping table is shown in the above Table 1. Based on the CQI, the appropriate MCS is gotten from Table 1. So the instantaneous transmission rate $R_i$ for the $i^{th}$ MS is $$R_i = \frac{\text{Bits(each modulation)} * \text{code rate}}{\text{symbol duration}} \qquad (7)$$

In S504, BS computes each MS's weigh index whose value means how static the user's channel is. The value "1" means the channel is the most static. We define $\Delta CQI_i(n)$ is the $i^{th}$ MS's CQI standard variance during the last frame (the $n^{th}$ frame). So the weight index $W_i$ for the $i^{th}$ MS is, $$W_i = \begin{cases} 1 & \sum_{i \in all\ MS} \Delta CQI_i(n) = 0 \\ 1 - \frac{\Delta CQI_i(n)}{\sum_{i \in all\ MS} \Delta CQI_i(n)} & \text{otherwise;} \end{cases} \quad n \in Z^+ \qquad (8)$$

So the estimated effective transmission rate $R_i^{effective}$ for the $i^{th}$ MS in the $(n+1)^{th}$ frame is computed as:

$$R_i^{effective} = R_i * W_i \qquad (9)$$

As shown in Equation (9), the weight index $W_i$ in the $(n+1)^{th}$ frame can be regarded as a correction factor for the instantaneous transmission rate $R_i$ for the $(n+1)^{th}$ frame with respect to the $i^{th}$ MS (Equation (7)).

In S505, the BS uses each MS's corrected transmission rate for PF scheduling. The style of PF scheduling is the same as the prior arts. The BS records each MS's history throughput $R_i^{history}$, and picks the MS which has the maximum metric $$M = \max_i (M_i)$$

in Equation (10) for data transmission in the next frame (the $(n+1)^{th}$ frame).

$$M_i = \frac{R_i^{effective}}{R_i^{history}} = \frac{R_i}{R_i^{history}} * W_i \qquad (10)$$

In S507, the user with the highest metric $$M = \max_i (M_i)$$

out of all the users which is granted the transmission opportunity in the next frame will transmit its data in the $(n+1)^{th}$ frame.

In the above two embodiments, the weight index $W_i$ and/or the estimated symbol good rate $\hat{\alpha}_i(n+1)$ in the $(n+1)^{th}$ frame can be regarded as a correction factor for the instantaneous transmission rate $R_i$ for the $(n+1)^{th}$ frame with respect to the $i^{th}$ MS (Equations (2) and (7)), or can be regarded as a correction factor for the metric $$M_i = \frac{R_i^{effective}}{R_i^{history}}.$$ (Equation (1))

Hardware Implementations

Figure 6:
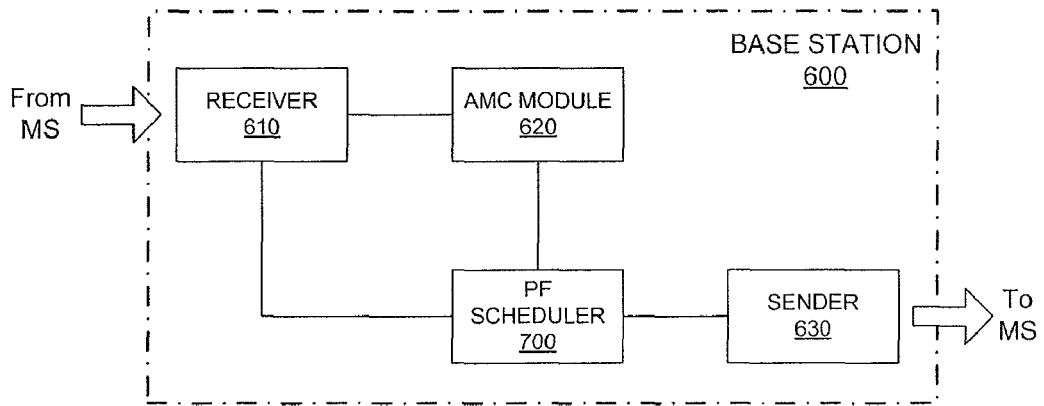
FIG. 6 is a block diagram showing a BS 600 which involves a PF scheduler 700 according to the present invention.
Figure 7A:
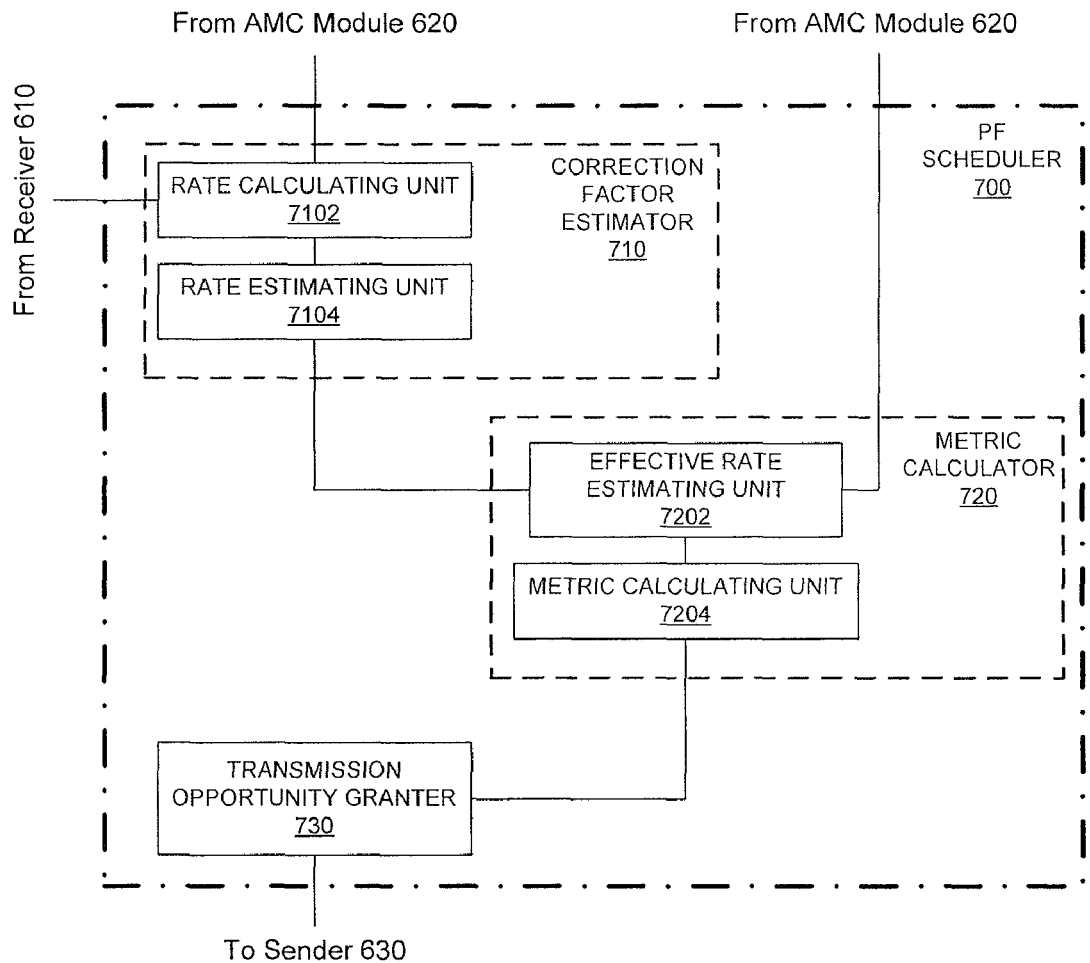
FIGS. 7a and 7b are block diagrams showing the PF scheduler 700 according to two embodiments of the present invention.
Figure 7B:
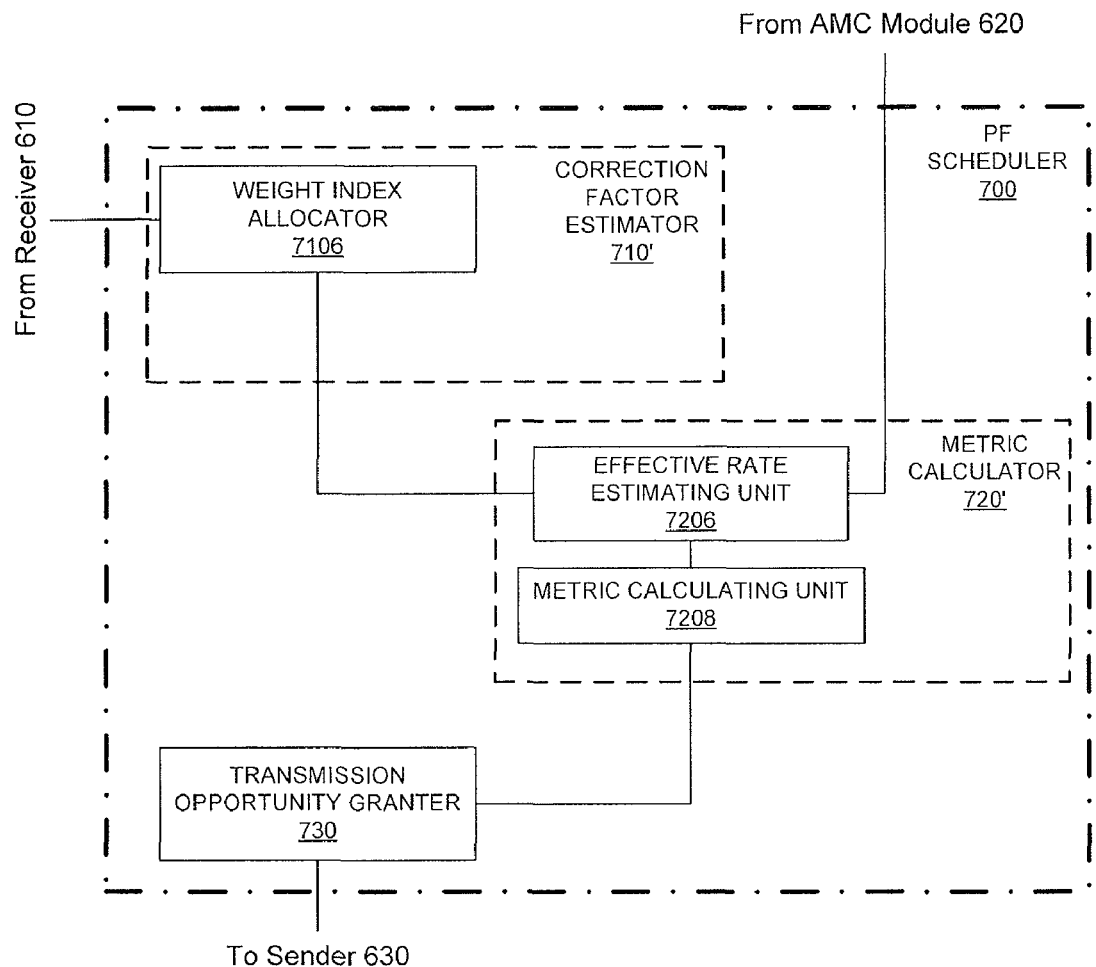

FIG. 6 is a block diagram showing a BS 600 which involves a PF scheduler 700 according to the present invention, and FIGS. 7a and 7b are block diagrams showing the PF scheduler 700 according to two embodiments of the present invention.

As shown in FIG. 6, the BS 600 includes a receiver 610, an AMC (Adaptive Modulation Coding) module 620, a PF scheduler 700, and a sender 630. The receiver 610, for the $i^{th}$ MS in the serving cell of BS 600, receives CQI for respective symbols in the $n^{th}$ frame (the current frame) from the $i^{th}$ MS. The AMC module 620, for the $i^{th}$ MS in the serving cell of the base station, determines a modulation coding scheme (MCS) to be used in the $(n+1)^{th}$ frame (the next frame) based on the received CQI, and thereby determines the instantaneous transmission rate for the $i^{th}$ MS based on the determined MCS.

As discussed above, the AMC module 620 may determine the MCS to be used in the $(n+1)^{th}$ frame based on the received CQI by following a threshold-based mapping method. In this situation, the AMC module 620 uses a MCS mapping table (Table 1) to determine the MCS to be used in the $(n+1)^{th}$ frame based on the received CQI. the AMC module 620 firstly calculates an SNR for the $n^{th}$ frame based on the received CQI, and then compares the calculated SNR with the SNR thresholds in the MCS mapping table (Table 1) to determine the MCS to be used in the $(n+1)^{th}$ frame.

Based on the measured CQI and the threshold, the appropriate MCS for the next frame is gotten from Table 1. So the AMC module 620 may determine the instantaneous transmission rate $R_i$ for the $i^{th}$ MS as $$R_i = \frac{\text{Bits(each modulation)} * \text{code rate}}{\text{symbol duration}}$$ (11)

As shown in FIGS. 7a and 7b, the PF scheduler 700 includes a correction factor estimator 710(710'), a metric calculator 720(720'), and a transmission opportunity granter 730. The correction factor estimator 710(710'), for the $i^{th}$ MS in the serving cell of the BS 600, estimates a correction factor $(\hat{\alpha}_i(n+1)$ or $W_i)$ for the instantaneous transmission rate $R_i$ for the $(n+1)^{th}$ frame according to the statistical result on changes in a channel quality in the $n^{th}$ frame. The metric calculator 720(720'), for the $i^{th}$ MS in the serving cell of the BS 600, calculates a metric $M_i$ based on the instantaneous transmission rate $R_i$ for the $i^{th}$ MS, the estimated correction factor $(\hat{\alpha}_i(n+1)$ or $W_i)$ and a history throughput $R_i^{history}$ recorded for the $i^{th}$ MS. The transmission opportunity 730 granter grants a transmission opportunity in the $(n+1)^{th}$ frame to an MS having the optimal metric $$(M = \max_i(M_i))$$

out of all the MSs.

In one embodiment (FIG. 7a), the correction factor $(\hat{\alpha}_i(n+1)$ or $W_i)$ for the instantaneous transmission rate $R_i$ for the $(n+1)^{th}$ frame is an estimated symbol good rate $\hat{\alpha}_i(n+1)$, and the statistical result on changes in the channel quality in the $n^{th}$ frame is a symbol bad rate $\beta_i(n)$ in the $n^{th}$ frame. In this situation, the correction factor estimator 710 includes a rate calculating unit 7102 and a rate estimating unit 7104. The rate calculating unit 7102 calculates a symbol bad rate $\beta_i$ in a frame based on the received CQI and the determined MCS. The rate calculating unit 7102 counts a symbol having a CQI value below the MCS threshold as a bad symbol, and calculates the symbol bad rate $\beta_i$ in the a frame as:

$$\beta_i = \frac{\text{Num of bad symbols in a frame}}{\text{Num of symbols in a frame}}$$ (12)

The rate estimating unit 7104 estimates a symbol good rate $\hat{\alpha}_i(n+1)$ in the $(n+1)^{th}$ frame based on the calculated symbol bad rate $\beta_i(n)$ in the $n^{th}$ frame. Particularly, the rate estimating unit 7104 may calculates the symbol good rate $\hat{\alpha}_i(n+1)$ in the $(n+1)^{th}$ frame as:

$$\hat{\alpha}_i(n+1) = 1 - \hat{\beta}_i(n+1)$$ (13)

where $\hat{\beta}_i(n+1)$ denotes an estimated symbol bad rate in the $(n+1)^{th}$ frame and is obtained by the rate estimating unit 7104 by following:

$$\hat{\beta}_i(n+1) = \gamma * \beta_i(n) + (1-\gamma) * \hat{\beta}_i(n-1); n \in Z^+$$ (14)

where $\beta_i(n)$ is the $i^{th}$ MS's bad rate in the $n^{th}$ frame, $\hat{\beta}_i(n-1)$ is the $i^{th}$ MS's estimated bad rate in the $(n-1)^{th}$ frame. That is to say, the estimated bad rate $\hat{\beta}_i(n+1)$ in the $(n+1)^{th}$ frame (the next frame) is dependent on the $i^{th}$ MS's bad rate $\beta_i(n)$ in the $n^{th}$ frame (the last frame) and the $i^{th}$ MS's estimated bad rate $\hat{\beta}_i(n-1)$ in the $(n-1)^{th}$ frame (frame immediately before the last frame). The initial value $\hat{\beta}_i(0)$ (when n=1) is set into 0.

The metric calculator 720 includes an effective rate estimating unit 7202 for estimating an effective transmission rate $R_i^{effective}$ for the $i^{th}$ MS in the $(n+1)^{th}$ frame as $R_i^{effective} = R_i * \hat{\alpha}_i(n+1); n \in Z^+$; and a metric calculating unit 7204 for calculating the metric $M_i$ as $$M_i = \frac{R_i^{effective}}{R_i^{history}} = \frac{R_i}{R_i^{history}} * \hat{\alpha}_i(n+1).$$

In another embodiment (FIG. 7b), the correction factor $(\hat{\alpha}_i(n+1)$ or $W_i)$ for the instantaneous transmission rate $R_i$ for the $(n+1)^{th}$ frame is a weight index $W_i$, and the statistical result on changes in the channel quality in the $n^{th}$ frame is a CQI standard variance $\Delta CQI_i(n)$ in the $n^{th}$ frame. In this situation, the correction factor estimator 710' includes a weight index allocator 7106 for allocating a weight index $W_i$ to the $i^{th}$ MS based on a CQI standard variance $\Delta CQI_i(n)$ in the $n^{th}$ frame. The weight index $W_i$ to be allocated to the $i^{th}$ MS is determined by the weight index allocator 7106 by:

$$W_i = \begin{cases} 1 & \sum_{i \in all\ MS} \Delta CQI_i(n) = 0 \\ 1 - \frac{\Delta CQI_i(n)}{\sum_{i \in all\ MS} \Delta CQI_i(n)} & \text{otherwise;} \end{cases} \quad n \in Z^+$$ (15)

The metric calculator 720' includes an effective rate estimating unit 7206 for estimating an effective transmission rate $R_i^{effective}$ for the $i^{th}$ MS in the $(n+1)^{th}$ frame as $R_i^{effective}=R_i*W_i$; and a metric calculating unit 7208 for calculating the metric $M_i$ as $$M_i = \frac{R_i^{effective}}{R_i^{history}} = \frac{R_i}{R_i^{history}} * W_i.$$

As shown in both FIGS. 7a and 7b, the transmission opportunity granter 730 grants the transmission opportunity in the $(n+1)^{th}$ frame to an MS having the maximum metric $$M = \max_i(M_i)$$

out of all the MSs.

Referring back to FIG. 6, the transmission opportunity granter 730 instructs its grant of the transmission opportunity in the $(n+1)^{th}$ frame via the sender 630. Thus, the MS with the highest metric $$M = \max_i(M_i)$$

out of all the users which is granted the transmission opportunity in the next frame will transmit its data in the $(n+1)^{th}$ frame.

Although the hardware implementations of the present invention are shown in FIGS. 6, 7a and 7b, it would be understood by those skilled that these are only for the purpose of examples. Various changes in their details may be made, for example, combining two or more components into one and/or separating one component into two or more. However, such changes or modifications shall be construed as being encompassed in the scope of the invention. For example, the receiver 610, the AMC module 620 and/or the sender 630 may also be considered as a part of the scheduler 700.

Simulation Results

Table 2 gives link level simulation parameters for the performance comparison of the proposed scheduling processes in respective sending SNR settings.

TABLE 2

Link level simulation parameters

| Parameters | Value |
|---|---|
| Bandwidth | 10 MHz |
| Frequency | 2.5 GHz |
| No. of sub-carriers | 1024 |
| No. of multi-paths | 6 |
| Frame length | 5 ms |
| Cyclic prefix length | ⅛ |
| MCS | QPSK ½; QPSK ¾; 16QAM ½; 16QAM ¾; 64QAM ⅔; 64QAM ¾ |
| Channel type | Rayleigh fading channel (Parameters are set according to Reference [6]) |
| Move pattern | Pedestrian A: 3 km/h, Vehicular A: 40 km/h, 80 km/h and 120 km/h |

Figure 8:
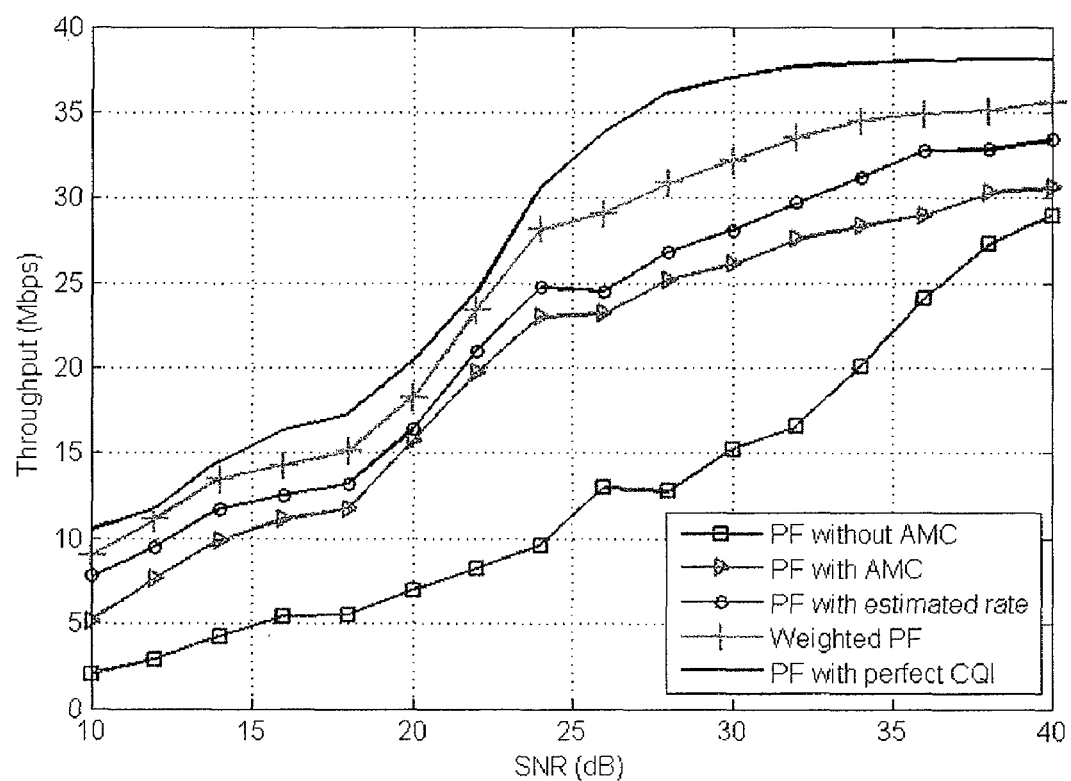
FIG. 8 shows the simulation results in term of SNR vs. Throughput graphs.

FIG. 8 shows the simulation results in term of SNR vs. Throughput graphs. "PF without AMC" means the scheduling algorithm is working with the fixed MCS. The used modulation and coding schemes are defined before hand, which can't be adapted to the channel variations. "PF with AMC" is the traditional PF scheduling algorithm which uses the threshold-based AMC as aforementioned. "PF with estimated rate" denotes the $1^{st}$ embodiment of the present invention. "Weighted PF" denotes the $2^{nd}$ embodiment of the present invention. In the perfect CQI case, we assume that the PF scheduler 'knows' each user's channel variation exactly before hand, so it could make an accurate decision on scheduling ("PE with perfect CQI"). Although this perfect CQI case does not exist in the real scenario, it is useful to compare how effective the proposed PF scheduling processes are. The total throughput of the system for different scheduling algorithms is shown in FIG. 8.

The throughput for "PF without AMC" is the lowest because when the channel is becoming into a bad condition, it is still using the original MCS, which would make the user's packet transmission failed. PF scheduling with the AMC module's help provides a better performance ("PF with AMC"). But when the channel is varying, this scheme is worse than the "PF with estimated rate" algorithm. The improvements lie in that we estimate the user's number of failed symbols in the next frame before scheduling according to the $1^{st}$ embodiment of the present invention.

Since the channel prediction is hard to be totally accurate, we could provide more resource to the less channel variation users in "Weighted PF" algorithm according the $2^{nd}$ embodiment of the present invention. So the throughput of the "Weighted PF" scheduler is much higher than the "PF with AMC" and "PF with estimated rate".

Figure 9:
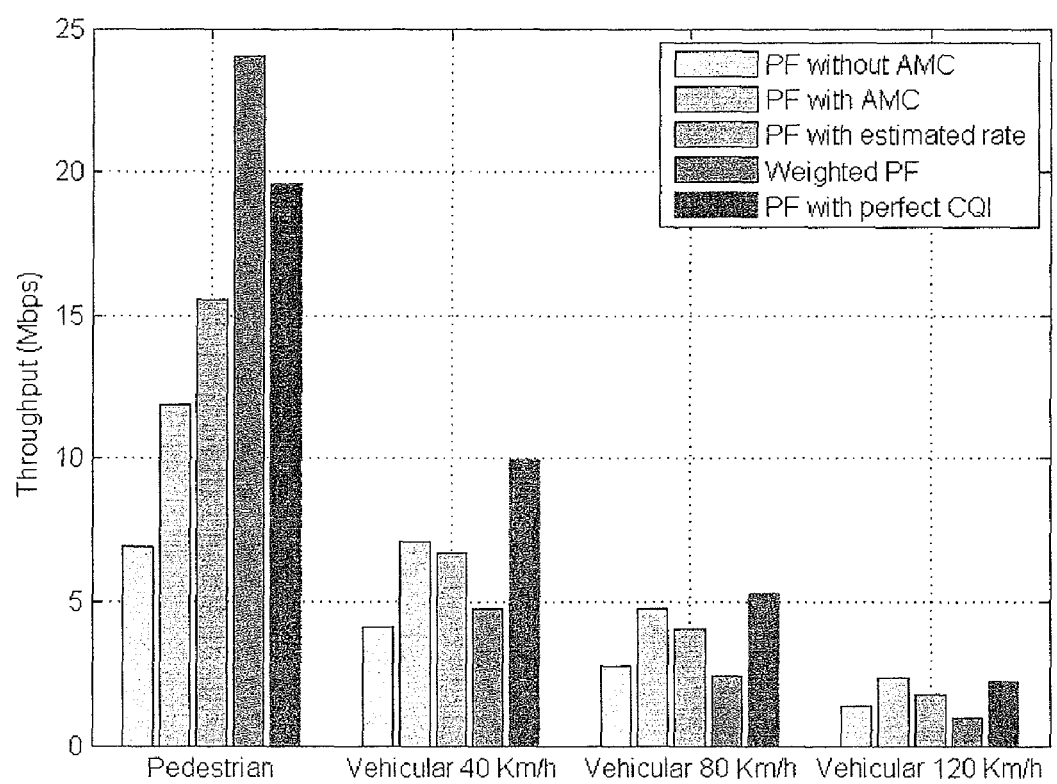
FIG. 9 is a histogram showing the user's total throughput of each moving type when SNR is 30 dB.

FIG. 9 is a histogram showing the user's total throughput of each moving type when SNR is 30 dB. As it is expected, the "Weighted PF" scheduling algorithm (according the $2^{nd}$ embodiment of the present invention) greatly increases the pedestrian users' throughputs, but lowers the vehicular users' throughputs.

When we provide much more radio resources to the users whose channel variation is low, the fairness between the multiple users will be deteriorated. Here we use the Jain fairness index (cf. Reference [7]) f to investigate the fairness loss due to the proposed PF scheduling processes. f is defined as $$f = \frac{\left(\sum_{i=1}^{n} x_i\right)^2}{\left(n\sum_{i=1}^{n} x_i^2\right)} \qquad (16)$$

where $x_i$ is the throughput of the $i^{th}$ user, n is the number of users in the cell. The more the index is close to 1, the fairer the system is.

When SNR is set to 30 dB, the fairness performance is shown in Table 3. From Table 3, it can be seen that all algorithms except the weighted PF have a good Jain fairness performance.

TABLE 3

Performance of Fairness when SNR is 30 dB

| Algorithm | Jain Fairness Index |
|---|---|
| PF without AMC | 0.99 |
| PF with AMC | 0.99 |
| PF with estimated rate | 0.96 |
| Weighted PF | 0.75 |
| PF with perfect CQI | 0.97 |

From FIG. 9, we may find that the fairness loss of weighted PF is because the throughput of vehicular users is slightly lowered, but the throughput of pedestrian users is greatly improved. So it needs to apply another fairness criterion, proportional fairness (cf. Reference [8]), to describe the system performance. The system is called more proportional fair when there exists another resource allocation scheme which decreases one user's throughput by X, but the sum of all other users' increasing throughputs is more than X. Compared with the PF with AMC scheme, the weighted PF scheduler increases the throughputs of the pedestrian users while decreases the throughputs of vehicular users. However, the sum of increasing is much higher than the sum of decreasing. So, it can be concluded that the weighted PF is more proportional fair than the PF with AMC in the mixed movement scenario.

The foregoing description gives only the preferred embodiments of the present invention and is not intended to limit the present invention in any way. Thus, any modification, substitution, improvement or like made within the spirit and principle of the present invention should be encompassed by the scope of the present invention.

REFERENCE LIST

[1] A. Jalali, et. al, "Data Throughput of CDMA-HDR: a High Efficiency-High Data Rate Personal Communication Wireless System", VTC-S'2000, vol. 3, pp. 1854-1858, 2000.
[2] Project 802.16m Evaluation Methodology Document. WiMAX Forum, 2008.
[3] Patent Application Publication CN 1878142A.
[4] Patent Application Publication EP 1 926 260 A1.
[5] Patent Application Publication WO 2006/095387 A1.
[6] ITU-R M1225, "Guidelines for evaluation of radio transmission technologies for IMT-2000", 1997.
[7] R. Jain, "The art of computer systems performance analysis", John Wiley and Sons, 1991.
[8] F. Kelly, "Charging and rate control for elastic traffic", European Transactions on Telecommunications, vol. 8, pp. 33-37, 1997.

What is claimed is:

1. A proportional fairness scheduler used in a base station, which is applicable to a high mobility environment, the scheduler comprising:
a correction factor estimator which, for each user equipment in a serving cell of the base station, estimates a correction factor for an instantaneous transmission rate for a next frame according to a statistical result on changes in a channel quality in a current frame;
a metric calculator which, for each user equipment in the serving cell of the base station, calculates a metric based on the instantaneous transmission rate for the user equipment, the estimated correction factor and a history throughput recorded for the user equipment; and
a transmission opportunity granter which grants a transmission opportunity in the next frame to a user equipment having an optimal metric out of all the user equipments.

2. The proportional fairness scheduler used in a base station according to claim 1, wherein the correction factor for the instantaneous transmission rate for the next frame is an estimated symbol good rate, and the statistical result on changes in the channel quality in the current frame is a symbol bad rate in the current frame, and the correction factor estimator comprises:
a rate calculating unit which, for each user equipment in the serving cell of the base station, calculates a symbol bad rate in the current frame based on channel quality information for respective symbols in the current frame received from the user equipment and a modulation coding scheme to be used in the next frame; and
a rate estimating unit which, for each user equipment in the serving cell of the base station, estimates a symbol good rate in the next frame based on the calculated symbol bad rate in the current frame.

3. The proportional fairness scheduler used in a base station according to claim 2, wherein the modulation coding scheme to be used in the next frame is determined based on the received channel quality information by following a threshold-based mapping method.

4. The proportional fairness scheduler used in a base station according to claim 3, wherein a modulation coding scheme to threshold mapping table is used to determine the modulation coding scheme to be used in the next frame based on the received channel quality information.

5. The proportional fairness scheduler used in a base station according to claim 4, wherein a signal-to-noise ratio for the current frame is firstly calculated based on the received channel quality information, and the calculated signal-to-noise ratio is compared with signal-to-noise ratio thresholds in the modulation coding scheme to threshold mapping table to determine the modulation coding scheme to be used in the next frame.

6. The proportional fairness scheduler used in a base station according to claim 3, wherein the rate calculating unit counts a symbol having a channel quality information value below a threshold corresponding to the determined modulation coding scheme as a bad symbol, and calculates the symbol bad rate in the current frame as a ratio of the number of the bad symbols in the frame to the total number of the symbols in the current frame.

7. The proportional fairness scheduler used in a base station according to claim 2, wherein the rate estimating unit estimates the symbol good rate in the next frame based on both the calculated symbol bad rate in the current frame and an estimated symbol bad rate in a previous frame.

8. The proportional fairness scheduler used in a base station according to claim 7, wherein the rate estimating unit calculates the symbol good rate $\hat{\alpha}_i(n+1)$ in the next frame as:

$$\hat{\alpha}_i(n+1)=1-\hat{\beta}_i(n+1)$$

where $\hat{\beta}_i(n+1)$ denotes an estimated symbol bad rate in the next frame and is obtained by the rate estimating unit by following:

$$\hat{\beta}_i(n+1)=\gamma*\beta_i(n)+(1-\gamma)*\hat{\beta}_i(n-1); n \in Z^+$$

where $\beta_i(n)$ denotes the calculated symbol bad rate in the current frame, $\hat{\beta}_i(n-1)$ denotes the estimated symbol bad rate in a previous frame, $\gamma$ is a smoothing factor, the subscript i denotes the $i^{th}$ user equipment in the serving cell of the base station, n denotes the sequence number of frame, and the initial value $\hat{\beta}_i(0)$ when n=1 is set into 0.

9. The proportional fairness scheduler used in a base station according to claim 2, wherein the metric calculator comprises:
an effective rate estimating unit for estimating an effective transmission rate
for the user equipment in the next frame by correcting the instantaneous transmission rate with the estimated symbol good rate in the next frame; and a metric calculating unit for calculating the metric based on the estimated effective transmission rate for the user equipment in the next frame and a history throughput recorded for the user equipment.

10. The proportional fairness scheduler used in a base station according to claim 9, wherein the effective rate estimating unit estimates the effective transmission rate $R_i^{effective}$ following:

$$R_i^{effective} = R_i * \hat{\alpha}_i(n+1); n \in Z^+$$

where the subscript i denotes the $i^{th}$ user equipment in the serving cell of the base station, n denotes the sequence number of frame, $R_i$ denotes the instantaneous transmission rate, and $\hat{\alpha}_i(n+1)$ denotes the estimated symbol good rate.

11. The proportional fairness scheduler used in a base station according to claim 1, wherein the correction factor for the instantaneous transmission rate for the next frame is a weight index, and the statistical result on changes in the channel quality in the current frame is a channel quality information standard variance in the current frame, and the correction factor estimator comprises:

a weight index allocator which, for each user equipment in the serving cell of the base station, allocates a weight index to the user equipment based on a channel quality information standard variance in the current frame.

12. The proportional fairness scheduler used in a base station according to claim 11, wherein the channel quality information standard variance in the current frame is obtained by statistically analyzing channel quality information for respective symbols in the current frame received from the user equipment.

13. The proportional fairness scheduler used in a base station according to claim 12, wherein the weight index $W_i$, to be allocated to the user equipment is determined by the weight index allocator by:

$$W_i = \begin{cases} 1 & \sum_{i \in all\ MS} \Delta CQI_i(n) = 0 \\ 1 - \dfrac{\Delta CQI_i(n)}{\sum_{i \in all\ MS} \Delta CQI_i(n)} & \text{otherwise}; \end{cases} \quad n \in Z^+$$

where $\Delta CQI_i(n)$ denotes the channel quality information standard variance in the current frame, the subscript i denotes the $i^{th}$ user equipment in the serving cell of the base station, and n denotes the sequence number of frame.

14. The proportional fairness scheduler used in a base station according to claim 11, wherein the metric calculator comprises:

an effective rate estimating unit for estimating an effective transmission rate for the user equipment in the next frame by correcting the instantaneous transmission rate with the allocated weight index for the user equipment; and a metric calculating unit for calculating the metric based on the estimated effective transmission rate for the user equipment in the next frame and a history throughput recorded for the user equipment.

15. The proportional fairness scheduler used in a base station according to claim 14, wherein the effective rate estimating unit estimates the effective transmission rate $R_i^{effective}$ following:

$$R_i^{effective} = R_i * W_i$$

where the subscript i denotes the $i^{th}$ user equipment in the serving cell of the base station, $R_i$ denotes the instantaneous transmission rate, and $W_i$ denotes the weight index to be allocated to the user equipment.

16. The proportional fairness scheduler used in a base station according to claim 9, wherein the metric calculating unit calculates the metric $M_i$ by following:

$$M_i = \frac{R_i^{effective}}{R_i^{history}}$$

where the subscript i denotes the $i^{th}$ user equipment in the serving cell of the base station, $R_i^{effective}$ denotes the estimated effective transmission rate, and $R_i^{history}$, denotes the history throughput.

17. The proportional fairness scheduler used in a base station according to claim 16, wherein the transmission opportunity granter grants the transmission opportunity in the next frame to a user equipment having the maximum metric $M = \max(M_i)$ out of all the user equipments.

18. The proportional fairness scheduler used in a base station according to claim 14, wherein the metric calculating unit calculates the metric $M_i$ by following:

$$M_i = \frac{R_i^{effective}}{R_i^{history}}$$

where the subscript i denotes the $i^{th}$ user equipment in the serving cell of the base station, $R_i^{effective}$ denotes the estimated effective transmission rate, and $R_i^{history}$ denotes the history throughput.

19. The proportional fairness scheduler used in a base station according to claim 18, wherein the transmission opportunity granter grants the transmission opportunity in the next frame to a user equipment having the maximum metric $M = \max(M_i)$ out of all the user equipments.

20. The proportional fairness scheduler used in a base station according to claim 1, wherein the instantaneous transmission rate $R_i$ for the user equipment is determined based on a modulation coding scheme to be used in the next frame by following:

$$R_i = \frac{\text{Bits(each modulation)} * \text{code rate}}{\text{symbol duration}}.$$

21. A base station, comprising:

a receiver which, for each user equipment in the serving cell of the base station, receives channel quality information for respective symbols in a current frame from the user equipment;

an adaptive modulation coding unit which, for each user equipment in the serving cell of the base station, determines a modulation coding scheme to be used in a next frame based on the received channel quality information, and thereby determines an instantaneous transmission rate for the user equipment based on the determined modulation coding scheme; and the proportional fairness scheduler according to claim 1.

22. A proportional fairness scheduling method used in a base station, which is applicable to a high mobility environment, the method comprising:

for each user equipment in a serving cell of the base station
estimating, by one or more processors, a correction factor for an instantaneous transmission rate for a next frame according to a statistical result on changes in a channel quality in a current frame; and
calculating a metric based on the instantaneous transmission rate for the user equipment, the estimated correction factor and a history throughput recorded for the user equipment;

granting a transmission opportunity in the next frame to a user equipment having an optimal metric out of all the user equipments.

23. The proportional fairness scheduling method used in a base station according to claim 22, wherein the correction factor for the instantaneous transmission rate for the next frame is an estimated symbol good rate, and the statistical result on changes in the channel quality in the current frame is a symbol bad rate in the current frame, and the step of estimating a correction factor for an instantaneous transmission rate for a next frame according to a statistical result on changes in a channel quality in a current frame comprises sub-steps of:
for each user equipment in a serving cell of the base station
calculating a symbol bad rate in the current frame based on channel quality information for respective symbols in the current frame received from the user equipment and a modulation coding scheme to be used in the next frame; and estimating a symbol good rate in the next frame based on the calculated symbol bad rate in the current frame.

24. The proportional fairness scheduling method used in a base station according to claim 23, wherein the modulation coding scheme to be used in the next frame is determined based on the received channel quality information by following a threshold-based mapping method.

25. The proportional fairness scheduling method used in a base station according to claim 24, wherein a modulation coding scheme to threshold mapping table is used to determine the modulation coding scheme to be used in the next frame based on the received channel quality information.

26. The proportional fairness scheduling method used in a base station according to claim 25, wherein a signal-to-noise ratio for the current frame is firstly calculated based on the received channel quality information, and the calculated signal-to-noise ratio is compared with signal-to-noise ratio thresholds in the modulation coding scheme to threshold mapping table to determine the modulation coding scheme to be used in the next frame.

27. The proportional fairness scheduling method used in a base station according to claim 24, wherein a symbol having a channel quality information value below a threshold corresponding to the determined modulation coding scheme is counted as a bad symbol, and the symbol bad rate in the current frame is calculated as a ratio of the number of the bad symbols in the frame to the total number of the symbols in the current frame.

28. The proportional fairness scheduling method used in a base station according to claim 23, wherein the symbol good rate in the next frame is estimated based on both the calculated symbol bad rate in the current frame and an estimated symbol bad rate in a previous frame.

29. The proportional fairness scheduling method used in a base station according to claim 28, wherein the symbol good rate $\hat{\alpha}_i(n+1)$ in the next frame is calculated as:

$$\hat{\alpha}_i(n+1) = 1 - \hat{\beta}_i(n+1)$$

where $\hat{\beta}_i(n+1)$ denotes an estimated symbol bad rate in the next frame and is obtained by following:

$$\hat{\beta}_i(n+1) = \gamma * \beta_i(n) + (1-\gamma) * \hat{\beta}_i(n-1); \ n \in Z^+$$

where $\beta_i(n)$ denotes the calculated symbol bad rate in the current frame, $\hat{\beta}_i(n-1)$ denotes the estimated symbol bad rate in a previous frame, $\gamma$ is a smoothing factor, the subscript i denotes the $i^{th}$ user equipment in the serving cell of the base station, n denotes the sequence number of frame, and the initial value $\hat{\beta}_i(0)$, when n=1 is set into (0).

30. The proportional fairness scheduling method used in a base station according to claim 23, wherein the step calculating a metric based on the instantaneous transmission rate for the user equipment, the estimated correction factor and a history throughput recorded for the user equipment comprises sub-step of:

estimating an effective transmission rate for the user equipment in the next frame by correcting the instantaneous transmission rate with the estimated symbol good rate in the next frame; and calculating the metric based on the estimated effective transmission rate for the user equipment in the next frame and a history throughput recorded for the user equipment.

31. The proportional fairness scheduling method used in a base station according to claim 30, wherein the estimated effective transmission rate $R_i^{effective}$ is obtained by following:

$$R_i^{effective} = R_i * \hat{\alpha}_i(n+1); \ n \in Z^+$$

where the subscript i denotes the $i^{th}$ user equipment in the serving cell of the base station, n denotes the sequence number of frame, $R_i$ denotes the instantaneous transmission rate, and $\hat{\alpha}_i(n+1)$ denotes the estimated symbol good rate.

32. The proportional fairness scheduling method used in a base station according to claim 22, wherein the correction factor for the instantaneous transmission rate for the next frame is a weight index, and the statistical result on changes in the channel quality in the current frame is a channel quality information standard variance in the current frame, and the step of estimating a correction factor for an instantaneous transmission rate for a next frame according to a statistical result on changes in a channel quality in a current frame comprises sub-steps of:

for each user equipment in a serving cell of the base station allocating a weight index to the user equipment based on a channel quality information standard variance in the current frame.

33. The proportional fairness scheduling method used in a base station according to claim 32, wherein the channel quality information standard variance in the current frame is obtained by statistically analyzing channel quality information for respective symbols in the current frame received from the user equipment.

34. The proportional fairness scheduling method used in a base station according to claim 33, wherein the weight index $W_i$ to be allocated to the user equipment is determined by:

$$W_i = \begin{cases} 1 & \sum_{i \in all\ MS} \Delta CQI_i(n) = 0 \\ 1 - \frac{\Delta CQI_i(n)}{\sum_{i \in all\ MS} \Delta CQI_i(n)} & \text{otherwise;} \end{cases} \quad n \in Z^+$$

where $\Delta CQI_i(n)$ denotes the channel quality information standard variance in the current frame, the subscript i denotes the $i^{th}$ user equipment in the serving cell of the base station, and n denotes the sequence number of frame.

35. The proportional fairness scheduling method used in a base station according to claim 32, wherein the step calculating a metric based on the instantaneous transmission rate for the user equipment, the estimated correction factor and a history throughput recorded for the user equipment comprises sub-step of:
   estimating an effective transmission rate for the user equipment in the next frame by correcting the instantaneous transmission rate with the allocated weight index for the user equipment; and
   calculating the metric based on the estimated effective transmission rate for the user equipment in the next frame and a history throughput recorded for the user equipment.

36. The proportional fairness scheduling method used in a base station according to claim 35, wherein the estimated effective transmission rate $R_i^{effective}$ is obtained by following:

$$R_i^{effective} = R_i * W_i$$

where the subscript i denotes the $i^{th}$ user equipment in the serving cell of the base station, $R_i$ denotes the instantaneous transmission rate, and $W_i$ denotes the weight index to be allocated to the user equipment.

37. The proportional fairness scheduling method used in a base station according to claim 30, wherein the metric $M_i$, is calculated by following:

$$M_i = \frac{R_i^{effective}}{R_i^{history}}$$

where the subscript i denotes the $i^{th}$ user equipment in the serving cell of the base station, $R_i^{effective}$ denotes the estimated effective transmission rate, and $R_i^{history}$ denotes the history throughput.

38. The proportional fairness scheduling method used in a base station according to claim 37, wherein the transmission opportunity in the next frame is granted to a user equipment having the maximum metric M=max($M_i$) out of all the user equipments.

39. The proportional fairness scheduling method used in a base station according to claim 35, wherein the metric $M_i$ is calculated by following:

$$M_i = \frac{R_i^{effective}}{R_i^{history}}$$

where the subscript i denotes the ith user equipment in the serving cell of the base station, $R_i^{effective}$ denotes the estimated effective transmission rate, and $R_i^{history}$ denotes the history throughput.

40. The proportional fairness scheduling method used in a base station according to claim 39, wherein the transmission opportunity in the next frame is granted to a user equipment having the maximum metric M=max ($M_i$) out of all the user equipments.

41. The proportional fairness scheduling method used in a base station according to claim 22, wherein the instantaneous transmission rate R, for the user equipment is determined based on a modulation coding scheme to be used in the next frame by following:

$$R_i = \frac{\text{Bits(each modulation)} * \text{code rate}}{\text{symbol duration}}.$$

42. A proportional fairness scheduling method used in a base station, which is applicable to a high mobility environment, the method comprising: for each user equipment in a serving cell of the base station
   receiving channel quality information for respective symbols a current frame from the user equipment;
   determining a modulation coding scheme to be used in a next frame based on the received channel quality information;
   determining an instantaneous transmission rate based on the determined modulation coding scheme;
   estimating a correction factor for the instantaneous transmission rate for the next frame according to a statistical result on changes in a channel quality in a current frame; and
   calculating a metric based on the instantaneous transmission rate for the user equipment, the estimated correction factor and a history throughput recorded for the user equipment;
   granting a transmission opportunity in the next frame to a user equipment having an optimal metric out of all the user equipments.

* * * * *

UNITED STATES PATENT AND TRADEMARK OFFICE
CERTIFICATE OF CORRECTION

PATENT NO. : 8,289,875 B2
APPLICATION NO. : 12/627909
DATED : October 16, 2012
INVENTOR(S) : Gang Wang, Su Yi and Yong Xia It is certified that error appears in the above-identified patent and that said Letters Patent is hereby corrected as shown below:

In the Specification

Column 8, Line 45: delete "subscript/denotes" and insert -- subscript i denotes --.

Column 13, Line 6-8 (Approx.) (Equation (1)):

delete " $M_i = \dfrac{R_i^{effective}}{R_i^{history}}$ " and insert -- $M_i = \dfrac{R_i^{current}}{R_i^{history}}$ --.

In the Claims

Column 19, Line 8 (Approx.): In Claim 10, before "following:" insert -- by --.

Column 20, Line 4: In Claim 15, before "following:" insert -- by --.

Column 20, Line 5 (Approx.): In Claim 15, delete " $R_i^{effective} = R^i * W_i$ " and insert -- $R_i^{effective} = R_i * W_i$ --.

Column 22, Line 6 (Approx.): In Claim 29, delete " $\beta_i(n+1)$ " and insert -- $\hat{\beta}_i(n+1)$ --.

Column 22, Line 16 (Approx.): In Claim 29, delete " $\beta_i(0),$ " and insert -- $\hat{\beta}_i(0)$ --.

Column 24, Line 21: In Claim 41, delete "R," and insert -- $R_i$ --, therefor.

Column 24, Line 34 (Approx.): In Claim 42, delete "a" and insert -- in a --.

Signed and Sealed this
Fourteenth Day of October, 2014

Michelle K. Lee
*Deputy Director of the United States Patent and Trademark Office*